(12) United States Patent
Budowick

(10) Patent No.: US 7,874,586 B2
(45) Date of Patent: Jan. 25, 2011

(54) AIRBAG FOLDING ARRANGEMENT

(75) Inventor: Kenneth Budowick, Clinton Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 303 days.

(21) Appl. No.: 12/021,461

(22) Filed: Jan. 29, 2008

(65) Prior Publication Data

US 2009/0189371 A1  Jul. 30, 2009

(51) Int. Cl.
*B60R 21/20* (2006.01)

(52) U.S. Cl. .................................... 280/743.1

(58) Field of Classification Search .............. 280/728.1, 280/732, 743.1; 493/454, 457
See application file for complete search history.

(56) References Cited

U.S. PATENT DOCUMENTS

| | | | |
|---|---|---|---|
| 5,290,061 A * | 3/1994 | Bollaert | 280/743.1 |
| 5,425,551 A * | 6/1995 | Hawthorn | 280/743.1 |
| RE35,265 E | 6/1996 | Baker | |
| 5,529,339 A | 6/1996 | Niederman | |
| 5,605,350 A | 2/1997 | Bates et al. | |
| 5,782,737 A | 7/1998 | Warner | |
| 5,803,483 A | 9/1998 | Lunt | |
| 6,092,839 A * | 7/2000 | Nagano | 280/743.1 |
| 6,152,867 A * | 11/2000 | Heudorfer et al. | 493/451 |
| 6,286,866 B1 | 9/2001 | Satge et al. | |
| 6,331,015 B1 | 12/2001 | Doxey et al. | |
| 6,471,238 B2 | 10/2002 | Ishikawa et al. | |
| 6,547,709 B1 * | 4/2003 | Dennis | 493/405 |
| 6,874,811 B2 | 4/2005 | Enders et al. | |
| 6,994,664 B2 * | 2/2006 | Nishijima et al. | 493/449 |
| 7,090,248 B2 * | 8/2006 | Jenkins et al. | 280/743.1 |
| 7,125,044 B2 * | 10/2006 | Nishijima et al. | 280/743.1 |
| 7,232,153 B2 * | 6/2007 | Kawauchimaru et al. | 280/743.1 |
| 7,571,933 B2 * | 8/2009 | Thomas | 280/743.1 |
| 2007/0241541 A1 * | 10/2007 | Miwa et al. | 280/728.2 |

* cited by examiner

*Primary Examiner*—Toan C To
*Assistant Examiner*—Karen Jane J Amores
(74) *Attorney, Agent, or Firm*—Ralph E. Smith

(57) ABSTRACT

An airbag folding arrangement for an airbag that includes a housing, an inflation device, and an airbag deployable between a un-deployed and deployed state. The airbag includes a top panel, a bottom panel, a pair of side panels connecting the top panel and the bottom panels, and a crown panel that includes a central portion surrounded by a plurality of outer portions that connect the top panel, the bottom panel, and the pair of side panels. The top panel, bottom panel, and the side panels are radially folded in a direction toward the central portion of the crown panel and the outer portions of the crown panel are rolled in a direction toward the housing and toward the central portion when the airbag is in the un-deployed state such that the central portion is in direct communication with the inflation device.

10 Claims, 2 Drawing Sheets

AIRBAG FOLDING ARRANGEMENT

FIELD

The present invention relates to an airbag for a motor vehicle and, more particularly, to an airbag folding arrangement for an airbag for a motor vehicle.

BACKGROUND

Inflatable air bags are sometimes deployed in vehicles to protect the occupants in the event of a front collision that would tend to throw the occupant toward the dashboard and windshield. Generally, a driver side airbag is deployed in the steering wheel in a folded state proximate to an air inflator buried within the steering wheel or steering column. The passenger side airbag may be located within a housing in the dashboard.

In an emergency situation calling for deployment of the airbag, inflation gas is communicated from the inflator to rapidly inflate and deploy the airbag to contact the vehicle occupant as the occupant moves forward within the vehicle cabin. The airbag softens or at least cushions the motion of the occupant to protect the occupant from serious injury. In general, such airbags are commonly designed to be inflated in no more than a few milliseconds.

To be effective, the airbag cushion is generally stored in an out-of-the-way location until needed. Moreover, an air bag is stored in such a manner that it can be rapidly activated to function in the desired manner. In modern vehicle design, however, where space comes at a premium, out-of-the-way storage volumes for the storage of an air bag are usually rather limited. Thus, an air bag may typically be folded into a small packet so that it fits into a small volume.

SUMMARY

An airbag folding arrangement including a housing, an inflation device proximate the housing, and an airbag deployable between a un-deployed and deployed state. The airbag is secured to the housing and in communication with the inflation device. The airbag includes a top panel, a bottom panel, a pair of side panels connecting the top panel and the bottom panels, and a crown panel that includes a central portion surrounded by a plurality of outer portions that connect the top panel, the bottom panel, and the pair of side panels. The top panel, bottom panel, and the side panels are radially folded in a direction toward the central portion of the crown panel and the outer portions of the crown panel are rolled in a direction toward the housing and toward the central portion when the airbag is in the un-deployed state such that the central portion is in direct communication with the inflation device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description exemplary in nature and is in no way intended to limit the present teachings, its application, or uses.

Figure 1:
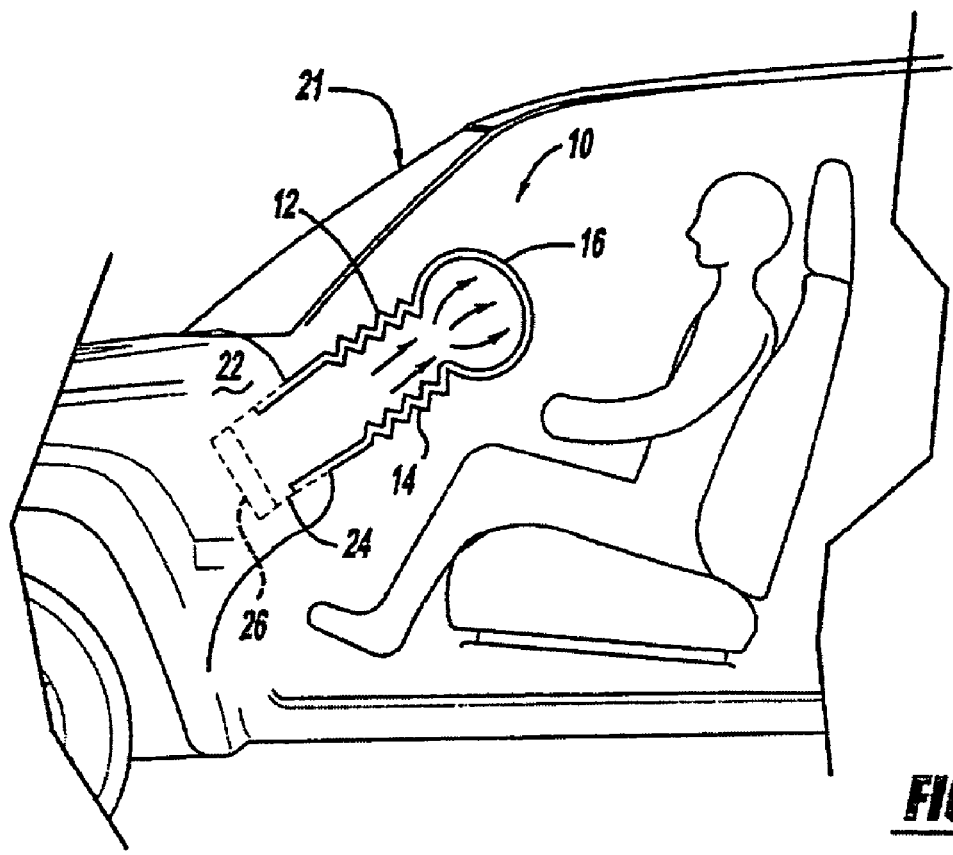
FIG. 1 is a cross-sectional view of an airbag being deployed from a housing disposed in a dashboard of a vehicle.
Figure 2:
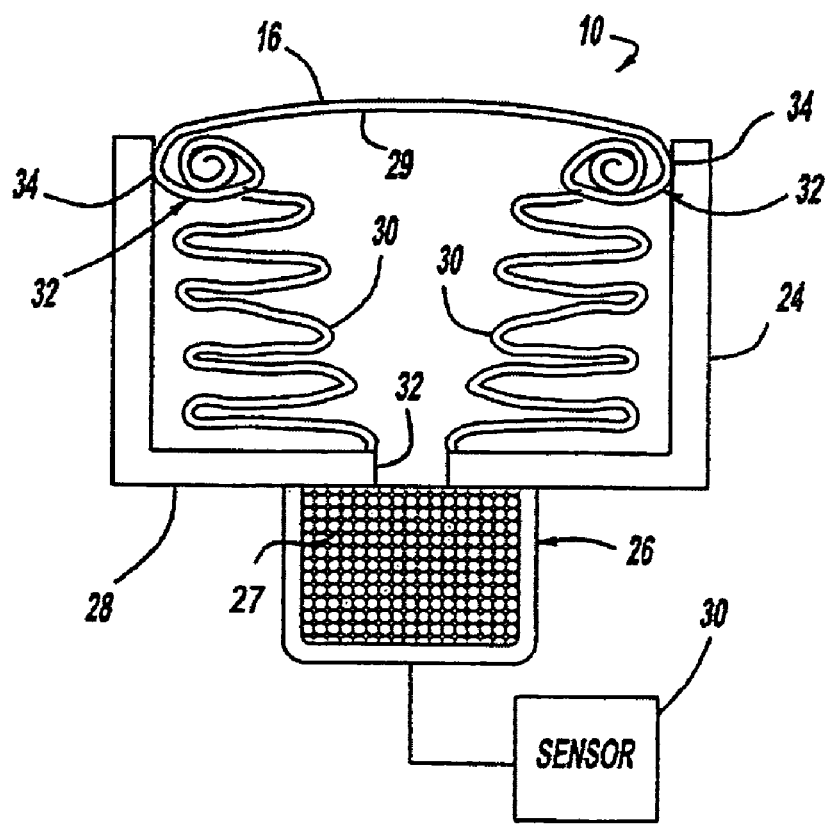
FIG. 2 is a cross-sectional view of an airbag within a housing.
Figure 3:
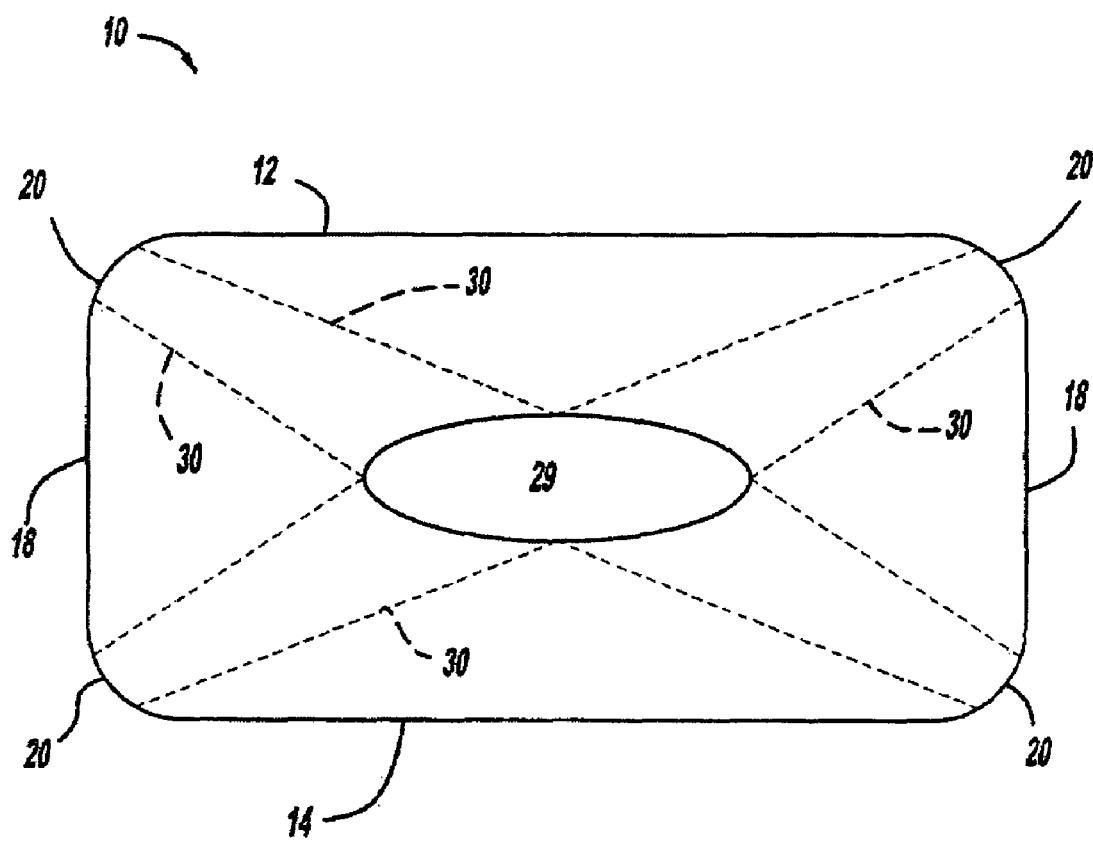
FIG. 3 is a top sectional view showing various folds of the airbag in phantom.

Referring to FIGS. 1 to 3, a passenger-side airbag according to the present teachings and its folding method will now be described. Airbag 10 may be formed of a material such as nylon or some other similar material known to those skilled in the art, and generally includes a top panel 12, a bottom panel 14, a crown panel 16, and a pair of side panels 18. Generally, airbag 10 may be rectangular-shaped and include rounded corners 20. Airbag 10 may be generally rectangular-shaped to fit within a dashboard 22 of a motor vehicle 21.

Airbag 10 may be secured to a housing 24 that may completely, or at least partly, accommodate airbag 10 when airbag 10 is in an un-deployed state. In this regard, housing 24 may be generally rectangular-shaped and include length, width, and height dimensions to accommodate the rectangular shape of airbag 10 when airbag 10 is un-deployed. To deploy airbag 10, housing 24 may include an inflation device 26 proximate a base 28 of housing 24 in communication with various sensors 30 that detect whether the motor vehicle 21 is involved in an event that requires includes inflation of airbag 10. If such an event should occur, inflation device 26 includes various chemicals 27 that release gas during a chemical reaction thereof and are directed to an opening 32 of housing 24 to inflate airbag 10. That is, if such an event occurs, sensors 30 detect the event and communicate a signal to inflation device 26 to conduct a chemical reaction of the chemicals therein to inflate airbag 10 with gas that is released as a result of the chemical reaction.

As gas is released during the chemical reaction, gas travels from inflation device 26 through base 28 and into housing 24 that houses airbag 10. The rapidly expanding gas is then free to expand airbag 10 and cause airbag 10 to deploy outward relative housing 24. To ensure that crown panel 16 of airbag 10 is deployed toward the occupant of the vehicle, airbag 10 may be folded within housing 24 in a manner such that during an event such as a collision, gas released by inflator 26 strikes crown panel 16 first. By first deploying crown panel 16 in a direction of the occupant, less risk of injury to the occupant occurs, and less risk of skew of airbag 10 during deployment is achieved. Skew occurs when airbag 10 does not deploy in a direction directly toward the occupant (i.e., in directions other than directly toward the occupant). By limiting the risk of skew of airbag 10, ancillary devices such as tethers that may prevent skew may be minimized or not required.

To ensure that crown panel 16 first deploys in a direction toward the occupant, as illustrated in FIGS. 2 and 3, airbag 10 may be folded in a pleated manner and stored within housing 24. To fold airbag 10 in a pleated or accordion fashion, top panel 12, bottom panel 14, and side panels 18 are radially folded a plurality of times in a direction toward a center 29 of airbag 10. The number of folds 30 required to fully dispose airbag 10 within housing 24 is not limited, and is dependent on a size Of the airbag or a size of housing 24. Although top panel 12, bottom panel 14, and side panels 18 are radially folded in a direction toward the center of airbag 10, a length of each fold 30 is such that the central portion 29 of crown panel 16 not blocked from being in direct communication with inflation device 26. Providing direct communication between inflation device 26 and a central portion 29 of crown panel 16 assists in ensuring that crown panel 16 is free to deploy first from housing 24.

After top panel 12, bottom panel 14, and side panels 18 are radially folded a plurality of times, excess fabric that forms crown panel 16 may be present proximate opening of housing 24. As illustrated in FIG. 2, however, outer portions 32 of crown panel 16 are rolled in a direction toward housing 24 and toward a center of crown panel 16. Similar to top panel 12, bottom panel 14, and side panels 18 each being folded such that central portion 29 of crown panel 16 is not blocked from being in direct communication with inflation device 26, outer portions 32 of crown panel 16 are rolled an amount to provide direct communication between inflation device and a central portion of crown panel 16, ensuring that crown panel 16 is free to deploy first from housing 24. That is, central portion 29 of crown panel 16 not blocked from being in direct communication with inflation device 26 by the rolled portions 34.

The direct communication of gas released by inflation device 26 causes crown panel 16 to first deploy from housing 24 relative to top panel 12, bottom panel 14, and side panels 18. That is, the folding arrangement provides an unrestricted path for the rapidly expanding gases to flow directly to crown panel 16 to deploy crown panel 16 out of housing 24 quickly. In this manner, a direct interaction of the bag 10 with the occupant occurs for faster occupant restraint, and inflation time of airbag 10 is not wasted to unfold airbag 10 in directions other than where the occupant is located. Moreover, consistency of airbag 10 deployment increases in that airbag 10 deploys from housing 24 the same way every time.

The above description is merely exemplary in nature and, thus, variations that do not depart from the gist of the present teachings are intended to be within the scope of the present teachings. Such variations are not to be regarded as a departure from the spirit and scope of the present teachings.

What is claimed is:

1. An apparatus comprising:
    a housing having an inlet and an outlet;
    an inflation device disposed at said inlet; and
    an airbag deployable between a un-deployed and deployed state, said airbag secured to said housing and in communication with said inflation device and including a top panel, a bottom panel, a pair of side panels connecting said top panel and said bottom panels, and a crown panel including a central portion surrounded by a plurality of outer portions that connect said top panel, said bottom panel, and said pair of side panels,
    wherein said top panel, bottom panel, and said side panels are pleated in a direction toward said central portion of said crown panel and said outer portions of said crown panel are rolled in an axial direction toward said inlet of said housing and radially toward said central portion when said airbag is in said un-deployed state such that said central portion is in direct communication with said inflation device; and
    wherein a length of each pleat proximate said outlet is less than a length of each pleat proximate said inlet of said housing.

2. The apparatus of claim 1, wherein when said airbag is deployed to said deployed state, said crown panel first deploys outward relative said housing.

3. The apparatus of claim 1, wherein said top panel, said bottom panel, and said side panels are radially folded in said direction toward said central portion.

4. The apparatus of claim 1, wherein said airbag is formed of fabric.

5. The apparatus of claim 1, wherein said top panel, said bottom panel, and said side panels deploy to said deployed state uniformly.

6. A method for folding an airbag including a top panel, a bottom panel, a pair of said panels, and a crown panel into an airbag housing having an inlet and an outlet, and an inflation device disposed at the inlet, comprising:
    forming pleats in the top panel, the bottom panel, and the pair of side panels by folding the top panel, the bottom panel, and the pair of side panels in a direction toward a center of the crown panel; and
    forming a roll by rolling outer portions of the crown panel relative said center of the crown panel in an axial direction toward the inlet of airbag housing and radially toward said center of the crown panel,
    wherein said pleats and said rolls leave said center of the crown panel in direct communication with the inflation device; and
    wherein a length of each pleat proximate an outlet of the housing is less than a length of each pleat proximate the inlet of the housing.

7. The method of claim 6, wherein when the airbag is deployed from the housing to a deployed state, the crown panel first deploys outward relative the housing.

8. The method of claim 6, wherein the top panel, the bottom panel, and the side panels are radially folded in said direction toward said center of the crown panel.

9. The method of claim 6, wherein when the airbag is deployed from the housing to a deployed state the top panel, the bottom panel, and the side panels deploy to a deployed state uniformly.

10. The method of claim 6, wherein when the airbag is deployed, said pleats and rolls prevent skew of the airbag.

* * * * *